United States Patent
Toratani et al.

(10) Patent No.: US 9,246,270 B2
(45) Date of Patent: Jan. 26, 2016

(54) POWER SUPPLY CONNECTOR

(71) Applicants: FURUKAWA ELECTRIC CO., LTD., Chiyoda-ku, Tokyo (JP); NISSAN MOTOR CO., LTD., Yokohama-shi, Kanagawa (JP)

(72) Inventors: Tomoaki Toratani, Tokyo (JP); Naomi Takahashi, Tokyo (JP); Tsuyoshi Nakajima, Kanagawa (JP)

(73) Assignees: FURUKAWA ELECTRIC CO., LTD., Tokyo (JP); NISSAN MOTOR CO., LTD., Kanagawa (JP)

(*) Notice: Subject to any disclaimer, the term of this patent is extended or adjusted under 35 U.S.C. 154(b) by 0 days.

(21) Appl. No.: 14/692,708

(22) Filed: Apr. 21, 2015

(65) Prior Publication Data

US 2015/0229074 A1 Aug. 13, 2015

Related U.S. Application Data

(63) Continuation of application No. PCT/JP2013/078479, filed on Oct. 21, 2013.

(30) Foreign Application Priority Data

Oct. 22, 2012 (JP) ................. 2012-232602

(51) Int. Cl.
*H01R 13/629* (2006.01)
*B60L 11/18* (2006.01)
(Continued)

(52) U.S. Cl.
CPC ...... *H01R 13/62977* (2013.01); *B60L 11/1816* (2013.01); *B60L 11/1818* (2013.01);
(Continued)

(58) Field of Classification Search
CPC .. H01R 13/639; H01R 13/6272; H01R 13/62; H01R 13/641
USPC .......... 439/345, 350–352, 157, 310–311, 372
See application file for complete search history.

(56) References Cited

U.S. PATENT DOCUMENTS 5,112,246 A 5/1992 Kawase et al.
5,350,312 A 9/1994 Kuno et al.
(Continued)

FOREIGN PATENT DOCUMENTS

JP 3-208275 A 9/1991
JP 6-188044 A 7/1994

OTHER PUBLICATIONS

International Search Report for PCT/JP2013/078479 mailed Jan. 21, 2014.

*Primary Examiner* — Edwin A. Leon
(74) *Attorney, Agent, or Firm* — Hauptman Ham, LLP

(57) ABSTRACT

In a power supply connector, when defect is detected at the locking part by the defect detection means, sliding of the connector body and the grasping member with respect to the case is locked by the case lock mechanism; when defect is not detected at the locking part, the case lock mechanism is released and the connector body and the grasping member become slidable in a direction of nearly the same axis line with respect to the case. When the grasping member is slid forward with respect to the case in a state in which the case lock mechanism is released, the connector body becomes movable to the front with respect to the case. As a result, in the power supply connector, the connector in the power supply side is not connectable to the connector of the power reception side when there is a defect in the locking part.

2 Claims, 14 Drawing Sheets

(51) Int. Cl.
   *H01R 13/627*    (2006.01)
   *H01R 13/639*    (2006.01)
   *H01R 13/641*    (2006.01)
(52) U.S. Cl.
   CPC .......... *H01R13/6275* (2013.01); *H01R 13/639* (2013.01); *H01R 13/6397* (2013.01); *H01R 13/641* (2013.01); *Y02T 10/7005* (2013.01); *Y02T 90/14* (2013.01)

(56) References Cited

U.S. PATENT DOCUMENTS

| | | | | |
|---|---|---|---|---|
| 8,439,699 | B2* | 5/2013 | Ohmura | 439/372 |
| 8,758,039 | B2* | 6/2014 | Ishida et al. | 439/372 |
| 2002/0177348 | A1* | 11/2002 | Karamatsu et al. | 439/352 |
| 2014/0045360 | A1* | 2/2014 | Toratani et al. | 439/345 |
| 2015/0011111 | A1* | 1/2015 | Toratani et al. | 439/357 |

* cited by examiner

POWER SUPPLY CONNECTOR

RELATED APPLICATIONS

The present application is a continuation of International Application Number PCT/JP2013/078479, filed Oct. 21, 2013, which claims priority from Japanese Application Number 2012-232602, filed Oct. 22, 2012, the disclosures of which applications are hereby incorporated by reference herein in their entirety.

TECHNICAL FIELD

The present invention relates to a power supply connector for charging electricity, which is used in electric automobiles.

BACKGROUND ART

In recent years, from the view point of global environmental issues, electric automobiles that do not use fossil fuels are attracting attention. Electric automobiles are equipped with a battery for driving, and run on electricity charged in the battery.

For charging electric automobiles, there are methods of charging from regular domestic power sources and methods of rapid charging using special charging equipments. In either method, when charging, a power supply connector that matches the onboard power reception connector becomes necessary. Such connectors are designed for electric automobiles with ease of use and safety in consideration, and generally have different forms from connectors conventionally used for power lines.

As a power supply connector for such electric automobiles, for example, a power supply connector, which comprises a case, a connector body that is slidably mounted to this case and accommodates multiple terminals, a pipe-shaped handle that is slidably mounted along the same axis with the connector body, and a lever, wherein the handle moves forward with the rotation of the lever, and fits the connector body to the connector body of the power reception side, is known (Patent Document 1).

RELATED ART

Patent Documents

Patent Document 1: JP-A-H06-188044

SUMMARY

Here, in a connector for charging electric automobiles, to prevent the power supply connector from being pulled out from the power reception connector during electric conduction while charging, a lock mechanism is provided. If such a lock mechanism does not exist, it is not favorable because the power supply connector can be pulled out from the power reception connector in a state of electric conduction.

As such a lock mechanism, for example, there is a method of locking a lock pin or a latch provided on the power supply connector side to the locking part of the power reception connector side. By making sure this lock mechanism is not released during electric conduction, the power supply connector can be protected from being pulled out from the power reception connector.

However, in a situation where part of the locking part of the power reception connector side is damaged, there is a risk in that the lock mechanism does not work. For example, if the part to which the pin or latch locks on in the lock mechanism is damaged, the pin or latch cannot be locked, even when the pin or lock itself fit into the locking part in a protruding state. Thus, there is a risk of the power supply connector disconnecting from the power reception connector during electric conduction.

The present invention was made in view of such problems, and its object is to provide a power supply connector that detects the damage of the locking part of the power reception connector side, and cannot be inserted to the power reception connector when it is damaged.

In order to achieve the above-described object, the present invention provides a power supply connector for electric automobiles, which comprises: a connector body; a case for accommodating the connector body; a grasping member that is attached to the case; a locking member, which is provided in the case and locks the case and a locking part of a power reception connector that is the object of connection; a defect detection means for detecting defect of the locking part to which the locking member locks; and a case lock mechanism that limits the movement of the case with respect to the grasping member; wherein when a defect of the locking part is detected by the defect detection means, the sliding motion of the connector body and the grasping member with respect to the case is locked by the case lock mechanism, and when a defect of the locking part is not detected by the defect detection means, the case lock mechanism is released and the connector body and the grasping member become slidable in a direction of nearly the same axis line with respect to the case, and in a state where the case lock mechanism is released, when the grasping member is moved toward the front with respect to the case, the connector body becomes movable toward the front with respect to the case, along with the movement of the grasping member.

It is preferable that the defect detection means comprises at least one pair of sliders, which are slidable in the insertion-removal direction of the case, formed in the vicinity of both sides of the locking member; and when the connector body is connected to the power reception connector, if both sliders in the pair of sliders comes in contact with the locking part and is pushed toward the inside of the case, the case lock mechanism is released and the connector body and the grasping member become slidable in a direction of nearly the same axis line with respect to the case; and when the connector body is connected to the power reception connector, if at least one slider in the pair of sliders does not come in contact with the locking part and is not pushed toward the inside of the case, the case lock mechanism is not released.

It is preferable that force is added to the pair of sliders in a direction so that they protrude from the case; and the ends of the pair of sliders are each rotatably connected to both ends of a first link member; and a second link member is rotatably connected to approximately the center of the first link member; and the second link member is rotatably connected to the case, while a cam member is connected thereto; and the case lock mechanism regulates the sliding of the grasping member with respect to the case by the interference between the cam member and the grasping member; and when both sliders in the pair of sliders are pushed into the case, the first link member is pushed toward the back, and the second link member rotates along with the movement of the first link member, and the cam member moves in an approximately vertical direction to the sliding direction of the slider, whereby the grasping member becomes slidable; and when at least one slider in the pair of sliders is not pushed into the case, the state of interference between the cam member and the grasping member is maintained and the case lock mechanism is not released.

According to the present invention, because a defect detection means for detecting defect in the locking part of the power reception connector is provided, when defect is detected, the case lock mechanism is not released and sliding of the connector body etc. with respect to the case becomes impossible. Thus, when there is a defect in the locking part the connector on the power supply side cannot be connected to the connector of the power reception side. Therefore, the connectors cannot be disconnected during electric conduction.

Further, in such case, because a pair of sliders is provided in the vicinity of both ends of the locking member and the case lock mechanism is released only when both sliders are pushed in and it is determined that there is no defect, it is also effective for partial defects.

In such situation, a first link member and a second link member are linked with a cam member, and the case lock mechanism is released by moving the cam member only when both sliders are pushed in, partial defect can be detected with certainty by a simple mechanical structure.

Effect of the Invention

According to the present invention, a power supply connector, which can make the lock mechanism for preventing the connector from disconnecting during electric conduct function with certainty, is provided.

DESCRIPTION OF SOME EMBODIMENTS

Figure 1A:
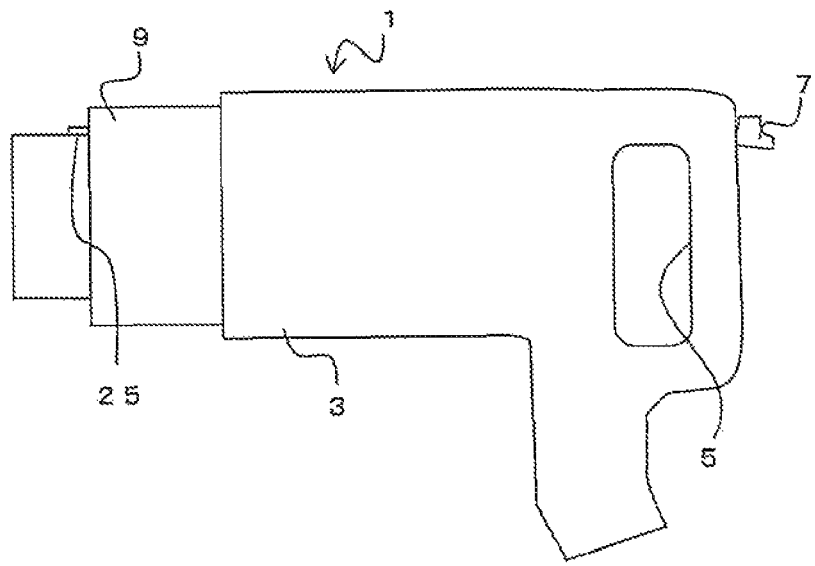
FIG. 1(a) is a side view of the power supply connector 1.
Figure 1B:
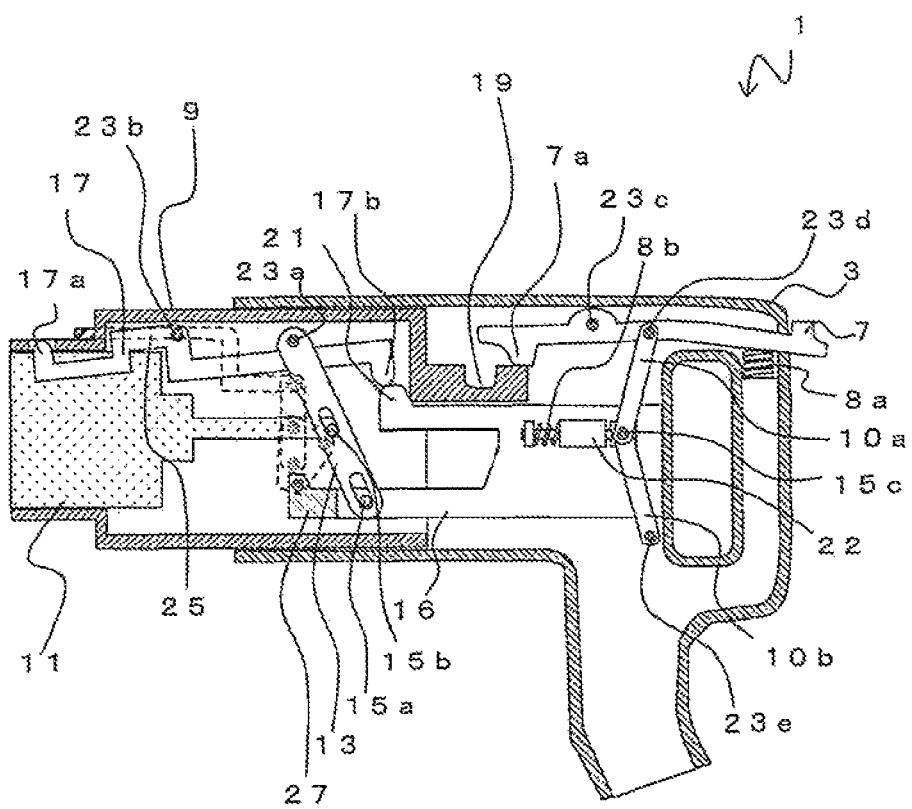
FIG. 1(b) is a sectional side view of the power supply connector 1.

Hereinafter, embodiments of the present invention will be described with reference to the accompanying figures. FIGS. 1(a) and (b) are schematic diagrams that indicate the power supply connector 1, and FIG. 1(a) is a side view, and FIG. 1(b) is a sectional side view. Note that in the present invention, the state shown in FIGS. 1(a) and (b) are referred to as the normal state. Further, in the following figures, cables and such are abbreviated from the figure. The power supply connector 1 mainly comprises a grasping member 3, a case 9 and a connector body 11.

As shown in FIG. 1(a) and FIG. 1(b), the grasping member 3 comprises a handle 5 on one end (rear). The handle 5 is the part that is held by the operator when handling the power supply connector 1. Here, the handle 5 is formed so that at least part of the handle 5 is positioned on a line that extends from the central axis of the connector body 11. For this reason, when the grasping member 3 is pushed in, force can be added to the connector body 11 in a straight direction against the object it is to be connected to. Thus, the power supply connector 1 is highly operable.

The interior of the grasping member 3 can accommodate various structures. A case 9 is provided on the other end (front) of the grasping member 3. The vicinity of the front end of the grasping member 3 is cylindrical, and part (rear part) of the case 9 is accommodated inside the grasping member 3. The grasping member 3 can slide back and forth with respect to the case 9.

The case 9 is a cylindrical member and the connector body 11 is accommodated in the front end of the case 9. The connector body 11 can slide back and forth with respect to the case 9. Note that guide mechanisms and stoppers that regulate the slidable area, which are abbreviated from the figure, may be provided in each slidable part of the grasping member 3 and the connector body 11, with respect to the case 9.

Inside the case 9 is provided an arm 13. The vicinity of one end of the arm 13 is rotatably attached to the case 9 with a pin 23a. The vicinity of the other end of the arm 13 is connected to a connection bar 16, which is joined to the grasping member 3, by a linkage 15a. At the linkage 15a, both parts are rotatably connected by an elongated hole formed on the arm 13 and a pin etc. formed on the connection bar 16.

The arm 13 is connected to the connector body 11 by a linkage 15b approximately at the center (between pin 23a and linkage 15a) of the arm 13. The composition of linkage 15b is similar to that of linkage 15a. That is, when the arm 13 rotates, the connector body 11 and the grasping member 3 are movable on a straight line with respect to the case 9, along with the rotation of the arm 13.

In the case 9 is provided a locking member 17. The locking member 17 is rotatably attached to the case 9 by a pin 23b. A lock pin 17a is formed in an upward direction at the front end of the locking member 17. The lock pin 17a is arranged at the position of an opening formed on the case 9.

At the rear end of the locking member 17 is provided a joint 17b in a downward direction. Joint 17b is of a convexed shape that can fit joint 21. The joint 21 is fixed on the grasping member 3 side. In a normal state, the joints 17b and 21 do not fit and the protrusion of joint 17b is positioned on top of the protrusion of joint 21. Further, in this state, because joint 17b is pushed upward by joint 21, the lock pin 17a does not protrude from the case 9 (the opening formed on the case 9) via pin 23b and remains within the case 9.

Figure 2A:
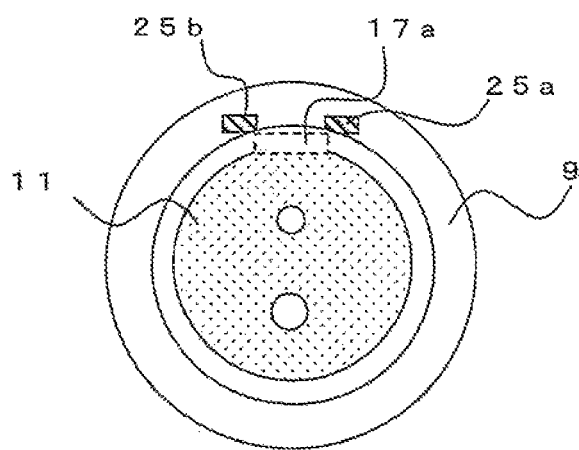
FIG. 2(a) is a front view of the vicinity of lock pin 17a and sliders 25a, 25b.
Figure 2B:
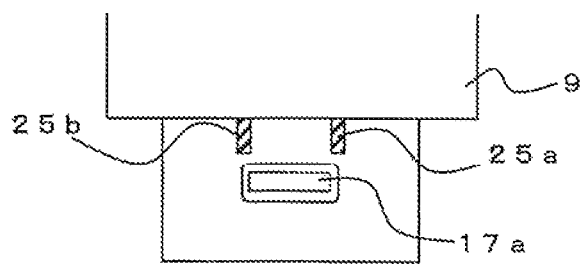
FIG. 2(b) is a top view of the vicinity of lock pin 17a and sliders 25a, 25b.

Inside the case 9 is provided a slider 25. FIG. 2(a) is a front view of lock pin 17a and the vicinity of sliders 25a, 25b, and FIG. 2(b) is a top view. One end of the slider 25 protrudes toward the front of the case 9. That is, a level difference is formed at the front of the case 9, and the slider 25 is exposed through this level difference. The slider 25 is slidable in the axial direction (the movement direction of the case 9, which is the insertion-extraction direction of the connector).

The slider 25 is provided at the rear of the lock pin 17a, and at least a pair of sliders 25a, 25b are provided in the vicinity of both sides of the lock pin 17a. Note that the sliders 25a, 25b, which are the defect detection means, and the structure connected to them within the case are indicated by a dotted line in FIGS. 1(a) and (b) etc., and their detailed structures etc. will be described later.

A lock lever 7, which is the operation part, is provided within the grasping member 3. The lock lever 7 is rotatably attached to the grasping member 3 by a pin 23c. The rear side end of the lock lever 7 protrudes out from the grasping member 3, allowing the operator to operate the lock lever 7 from the outside. A lock pin 7a is provided at the front of the lock lever 7 in a downward direction. The lock pin 7a comes in contact with part of the case 9, and is normally in a state of being pushed up. On the case 9 at the front side of the part that comes in contact with the lock pin 7a in a normal state, a concaved part 19, which the lock pin 7a can fit into, is provided.

Further, a spring 8a is provided in the vicinity of the rear end side of the lock lever 7. The spring 8a pushes up the vicinity of the rear end of the lock lever 7. That is, the lock pin 7a is pressed downward by the pin 23c as the fulcrum point.

Figure 3:
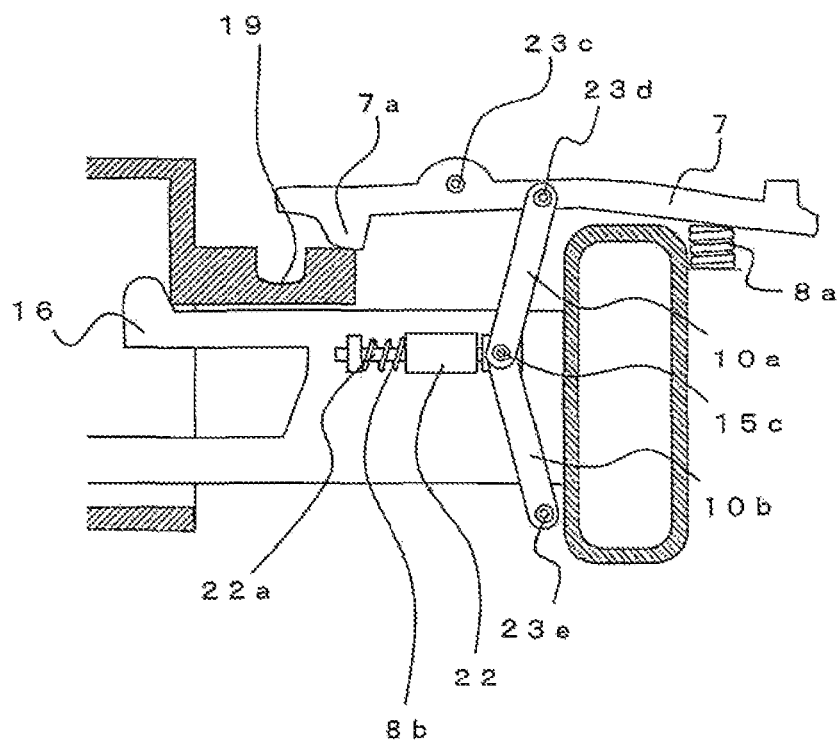
FIG. 3 is an enlarged view of the vicinity of the lock lever 7 of the power supply connector 1.

An electromagnetic solenoid 22 is connected to the lock lever 7 via link members 10a, and 10b. FIG. 3 is an enlarged view of the vicinity of the lock lever 7. At a position of the lock lever 7 further behind the pin 23c, one end of the link member 10a is rotatably connected with pin 23d.

The other end of the link member 10a is rotatably connected to one end of the link member 10b by a linkage 15c. Further, the other end of link member 10b is rotatably connected to the grasping member 3 by a pin 23e. Note that in a normal state, link members 10a and 10b are arranged at an angle from each other so that they are bent forward at the linkage 15c.

The electromagnetic solenoid 22 is fixed to the grasping member 3 in the vicinity of the linkage 15c. A plunger 22a penetrates the interior of the electromagnetic solenoid 22, and the plunger 22a can be operated by operating the electromagnetic solenoid 22. The end of the plunger 22a is connected to the linkage 15c. The plunger 22a is connected toward the rear side from the bent part (front) of the link members 10a and 10b in a normal state.

A spring 8b is provided on the electromagnetic solenoid 22. The spring 8b applies force to the plunger 22a in a direction that retracts the plunger 22a. Thus, in a normal state, the plunger 22a is pulled toward the front side by the spring 8b, which also causes the linkage 15c to be pulled toward the front. The link members 10a and 10b receive force in a direction that decreases their angle by the linkage 15c being pulled forward. Here, because the pin 23e is fixed to the grasping member 3, the pin 23d goes in a state of being pulled downward.

Figure 4A:
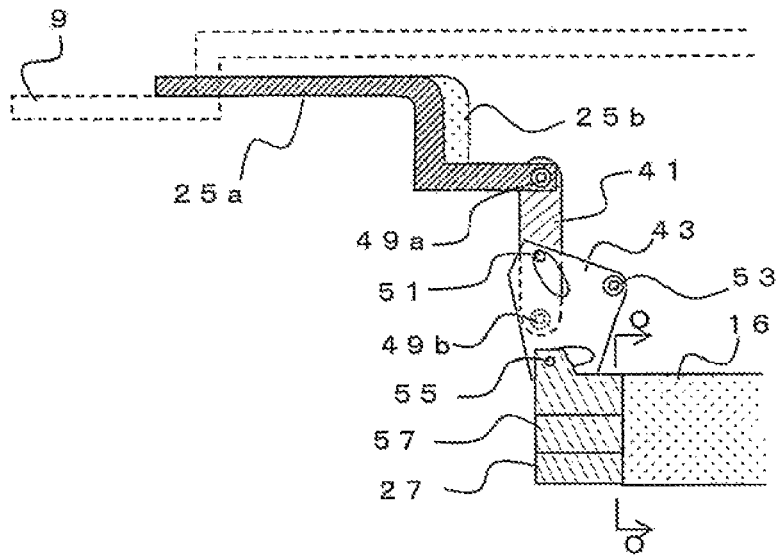
FIG. 4(a) shows the structure of the defect detection means seen from one side.
Figure 4B:
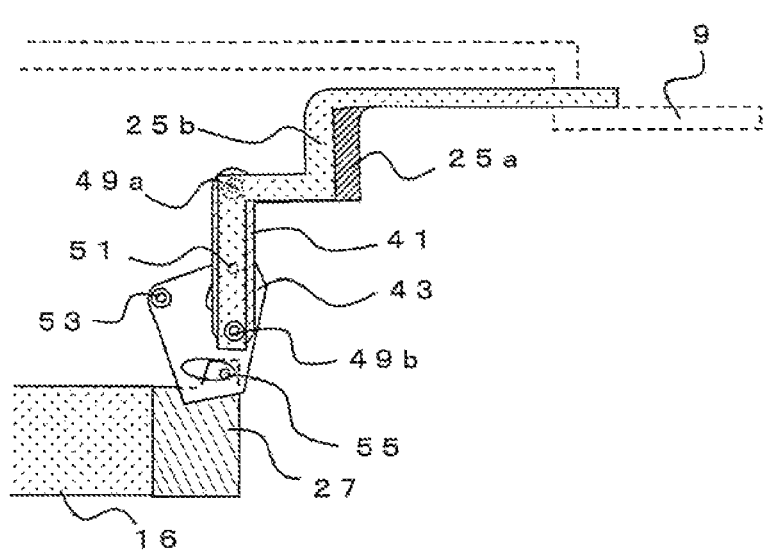
FIG. 4(b) shows the other side of FIG. 4(a).
Figure 4C:
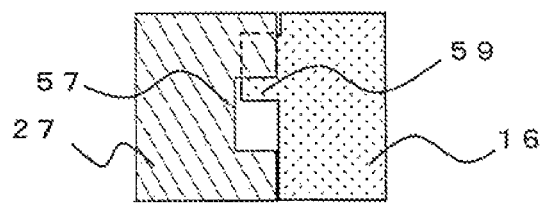
FIG. 4(c) is a sectional view of FIG. 4(a) at the O-O line.

Next, the defect detection means will be described. FIG. 4(a) is a figure that shows the structure of the defect detection means seen from one side, FIG. 4(b) shows the other side, and FIG. 4(c) is a sectional view of FIG. 4(a) at O-O line. Inside the case 9, both ends of the sliders 25a, 25b are rotatably connected to the linkages 49a, 49b in the vicinity of both ends of the link member 41, which is the first link member. Note that sliders 25a, 25b are slidable in a forward-backward direction (the left-right direction in the figure, which is the insertion-extraction direction of the connectors). Further, a spring member, which is abbreviated from the figure, adds force to the sliders 25a, 25b in a forward direction (in the direction protruding from the case 9).

At approximately the center of the link part 41, a link member 43, which is the second link member of the linkage 51, is rotatably connected. Note that the linkage 51 comprises, for example, a protrusion formed on the link member 41 and an elongated hole formed on the link member 43. In this case, by making the size of the hole sufficiently large with respect to the protrusion, the link member 43 can rotate with respect to the link member 41, as well as change its position.

The link member 43 is a tabular member, and part of it is rotatably fixed to the case 9 by a pin 53. That is, the link member 43 rotates with the pin 53 acting as its center. On the link member 43 in the vicinity of the end opposite to the linkage 51, a cam member 27 is rotatably connected by a linkage 55. Note that, as with the linkage 51, in the linkage 55, the cam member 27 rotates with respect to the link member 43 and its position can change, as well. Note that the cam member 27 is slidable in an up-down direction (the direction approximately vertical to the connection direction of the connector) by a guide that is abbreviated from the figure. Further, a spring member etc., which is abbreviated from the figure, adds force to the cam member 27 so that it is pulled downward in a normal state.

At the side surface of the cam member 27, a concaved groove 57 is provided. The tip of the connection bar 16 is positioned at the rear side of the cam member 27 in a part that is deviated toward the side. At the side in the vicinity of the tip of the connection bar 16, a convexed part 59 is provided. The convexed part 59 is of a form that corresponds to the concaved groove 57. In a normal state, the concaved groove 57 and the convexed part 59 are deviated in the height direction.

Figure 5A:
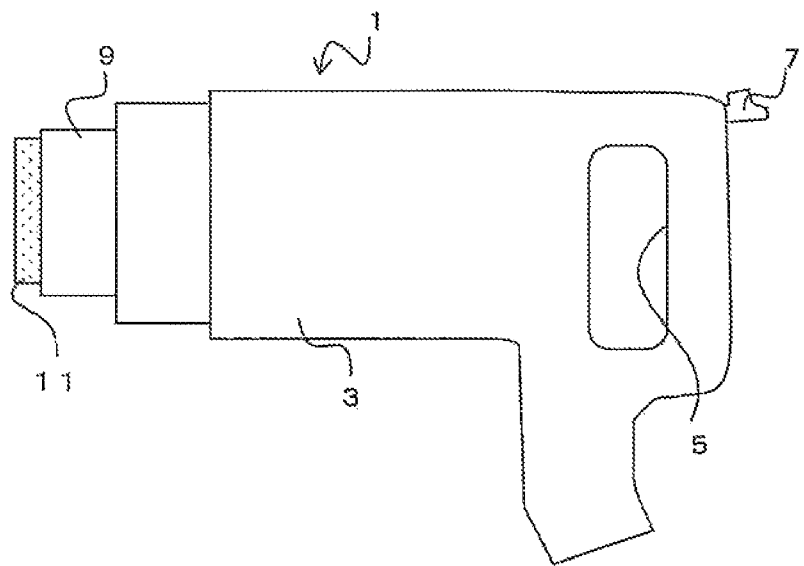
FIG. 5(a) is a side view of the power supply connector 1 in a state of operation.
Figure 5B:
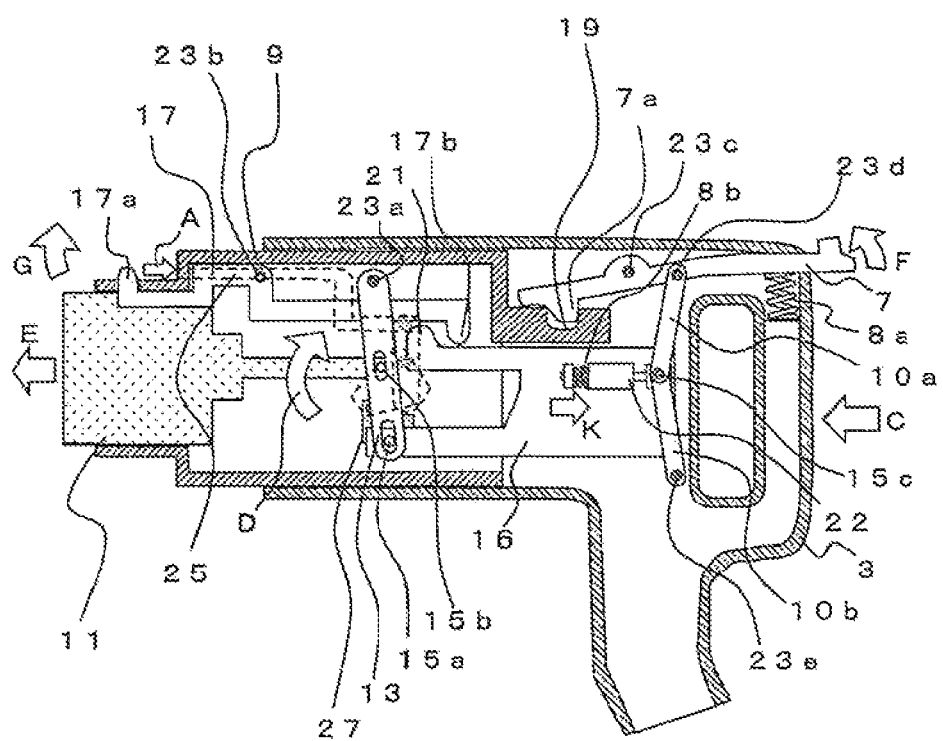
FIG. 5(b) is a sectional side view of the power supply connector 1 in a state of operation.

Next, a state in which the power supply connector 1 is operated will be described. FIGS. 5(a) and (b) are figures that show the power supply connector 1 in a state where the grasping member 3 is moved, and FIG. 5(a) is a side view, and FIG. 5(b) is a sectional side view.

As described previously, in the normal state, because the connection bar 16 of the grasping member 3 and the cam member 27 inside the case 9 interfere with each other, the grasping member 3 is prevented from sliding forward with respect to the case 9. Note that, this mechanism is referred to as the case lock mechanism. When the slider 25 is pushed in from this state (in the direction of arrow A in the Figure), the case lock mechanism is released along with the movement of the slider 25.

Figure 6A:
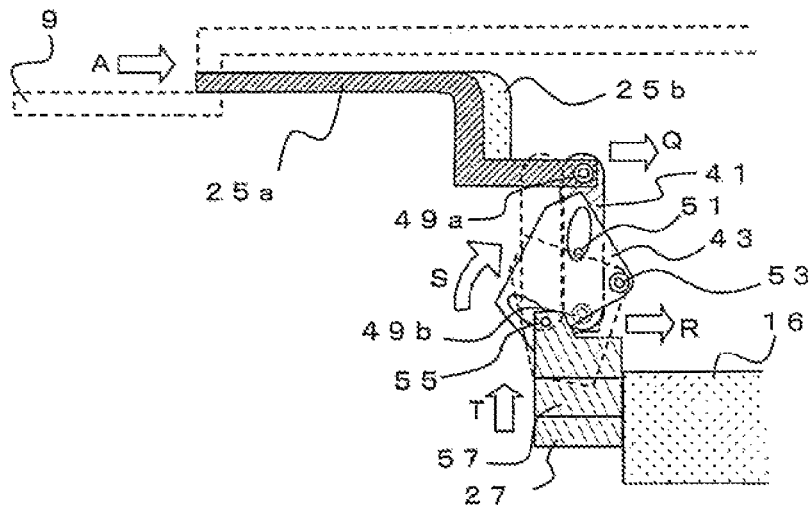
FIG. 6(a) is a figure that shows the structure of the defect detection means from one side in a state where the power supply connector 1 is in operation.
Figure 6B:
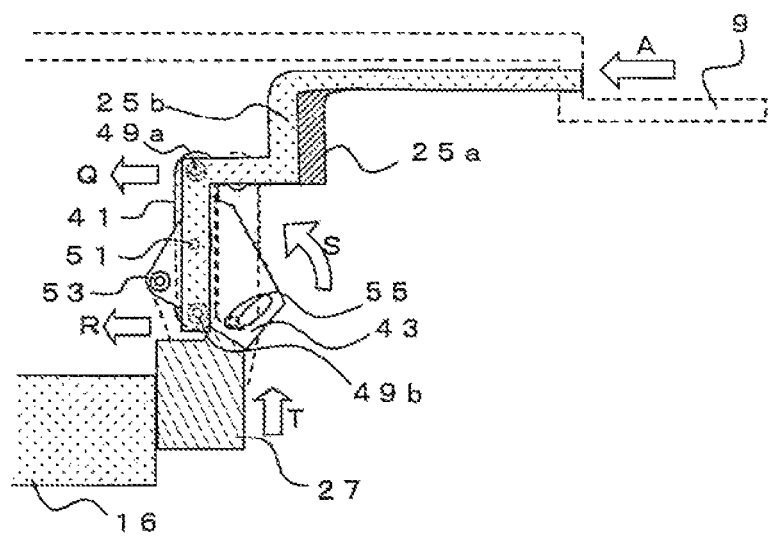
FIG. 6(b) shows the other side of FIG. 6(a).
Figure 6C:
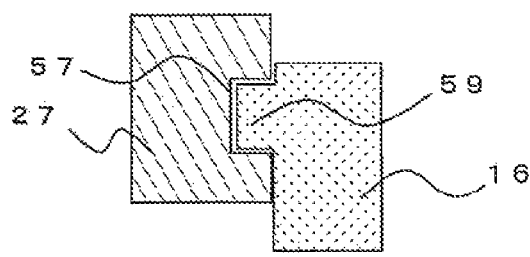
FIG. 6(c) is a sectional view of the cam member.

FIGS. 6(a), (b) and (c) are figures that show the movement of the defect detection means, and FIG. 6(a) shows the structure of the defect detection means from one side, FIG. 6(b) shows the other side, and FIG. 6(c) is a figure that corresponds to FIG. 4(c). When both sliders 25 (25a, 25b) are pushed into the case 9 (in the direction of arrow A in the figure), the other end part of the sliders 25a, 25b (the linkages 49a, 49b with the link member 41) are each pushed in toward the rear side (in the directions of arrow Q and arrow R). That is, the link member 41 moves toward the rear in an approximately parallel manner from the normal state.

When the link member moves toward the rear, the link member 43 connected to it rotates. More specifically, the linkage 51, which is in an upward position of the pin 53, rotates toward the rear side (the direction of arrow S in the figure) along with the link member 41 with the pin 53 acting as the center. The linkage 55, which is in the vicinity of the bottom end of the link member 43, moves in a manner so that it is lifted upward, along with the rotation of the link member 43. Thus, the cam member 27 moves upward (in the direction of arrow T in the figure.)

As shown in FIG. 6(c), the amount of movement of the cam member 27 in the upward direction, when sliders 25a, 25b are completely pushed into the case 9, is approximately equal to the deviation amount between the aforementioned concaved groove 57 of the cam member 27 and the convexed part 59 of the connection bar 16. Thus, with the movement of the cam member 27, the positions of the convexed groove 57 and the concaved part 59 match. That is, the interference between the cam member 27 and the connection bar 16 (grasping member 3) is relieved. Thus, the grasping member 3 becomes slidable with respect to the case 9. In this manner, the case lock mechanism is released.

As shown in FIG. 5(b), when the grasping member 3 is moved forward with respect to the case 9 (in the direction of arrow C in the figure) in a state where the lock between the case 9 and the grasping member 3 is released, the linkage 15a, which is jointed to the grasping member 3 (connection bar 16), is pushed in toward the front. Because the linkage 15a moves forward, the arm 13 rotates (in the direction of arrow D in the figure) with the pin 23a as its axis of rotation. The connector body 11, which is connected to the arm 13 by the linkage 15b, moves toward the same direction as the grasping member 3 (in the direction of arrow E in the figure), due to the rotation of the arm 13.

Note that the distance of movement for the grasping member 3 and the distance of movement for the connector body 11 with respect to the case 9 differ, because the linking positions to the arm 13 differ for the grasping member 3 and the connector body 11. Specifically, when the ratio of the distance of the linkages 15a and 15b from the pin 23a is 2:1, then if the distance of movement of the grasping member 3 with respect to the case 9 is set as 2, the distance of movement of the connector body 11 becomes 1. That is, the mechanism of the arm 13 etc., functions as a deceleration mechanism. By having a deceleration mechanism, the insertion-extraction process of the connector can be performed with little force.

Further, because the grasping member 3 moves forward with respect to the case 9, joint 17b and joint 21 join together to fit. Hence, the locking member 17 rotates with the pin 23b acting as its axis of rotation. That is, the locking member 17 rotates because the joint 17b side is pushed downward, and the lock pin 17a on the other end is pushed upward. Thus, the lock pin 17a protrudes outward (in the direction of arrow G in the figure) from the case 9 through the opening. Note that the locking member 17 may be formed with a spring etc., so that it constantly tries to return to the state shown in FIG. 5(b) (a state wherein the joint 17b is pushed down).

Further, because the grasping member 3 moves forward with respect to the case 9, the lock pin 7a of the lock lever 7 moves toward the concaved part 19. At this moment, the vicinity of the rear end of the lock lever 7 is pushed upward by the spring 8a (in the direction of arrow F in the figure). Thus, the lock lever 7 rotates with the pin 23c acting as its axis of rotation. Hence, the lock pin 7a fits into the concaved part 19.

Note that a detection means for detecting the position of the lock pin 7a may be provided in the vicinity of the concaved part 19 of the case 9. By doing so, the fitting of the lock pin 7a to the concaved part 19 can be detected with certainty.

Figure 7:
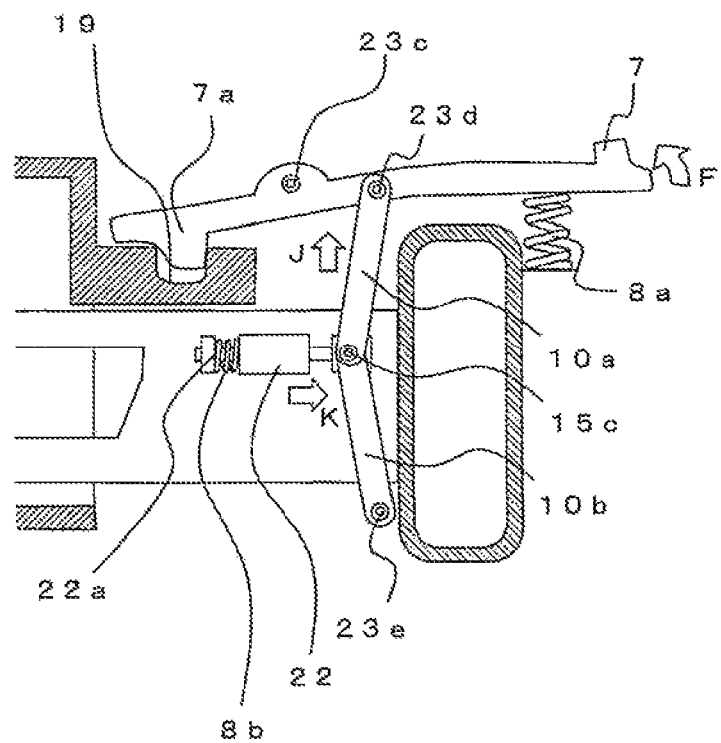
FIG. 7 is an enlarged view of the vicinity of the lock lever 7 of the power supply connector 1 in a state of operation.

When the lock lever 7 operates, force is conveyed to the electromagnetic solenoid 22 via link members 10a and 10b. FIG. 7 is an enlarged view of the vicinity of the lock lever 7. As described previously, the link member 10a is connected to the lock lever 7 by a pin 23d. Thus, by the upward movement of the lock lever 7, the link member 10a is pulled upward (in the direction of arrow J in the figure).

Here, the bottom end of the link member 10b is fixed to the grasping member 3 by the pin 23e. Thus, link members 10a and 10b move in the direction that increases their angle, along with the movement of the lock lever 7. That is, the linkage 15c moves toward the rear side.

In this case, the plunger 22a connected to the linkage 15c moves toward the rear side (in the direction that protrudes from the electromagnetic solenoid 22 body,) (in the direction of arrow K in the figure) in opposition to the restoration force of the spring 8b. Thus, when the plunger 22a is unable to move with respect to the electromagnetic solenoid 22 body due to freezing etc., the linkage 15c cannot move. Hence, in such a case, the lock lever 7 cannot rotate around the pin 23c, and the state of FIG. 7, wherein the lock pin 7a fits into the concaved part 19, cannot be obtained. Therefore, the operator can understand whether or not the plunger 22a is in a movable state.

If the plunger 22a is in a movable state, the lock pin 7a fits into the concaved part 19 by operation of the lock lever 7. Thus, the movement of the grasping member 3 with respect to the case 9 is locked. That is, the lock lever 7 functions as a locking means that locks the grasping member 3 (and the connector body 11) from moving with respect to the case 9. Further, it functions as a release mechanism for releasing the same lock by operating the lock lever 7 (pressing down the outside end of the lock lever 7). Thus, the connected state of the connector can be maintained with certainty, while further allowing easy release.

Note that a parallel link may be used as the sliding part of the grasping member 3 (or the connector body 11) and the case 9. By using a parallel link, rattling of the grasping member 3 (or the connector body 11) and the case 9 during sliding is less likely to occur, and the moving range can be regulated.

Figure 8:
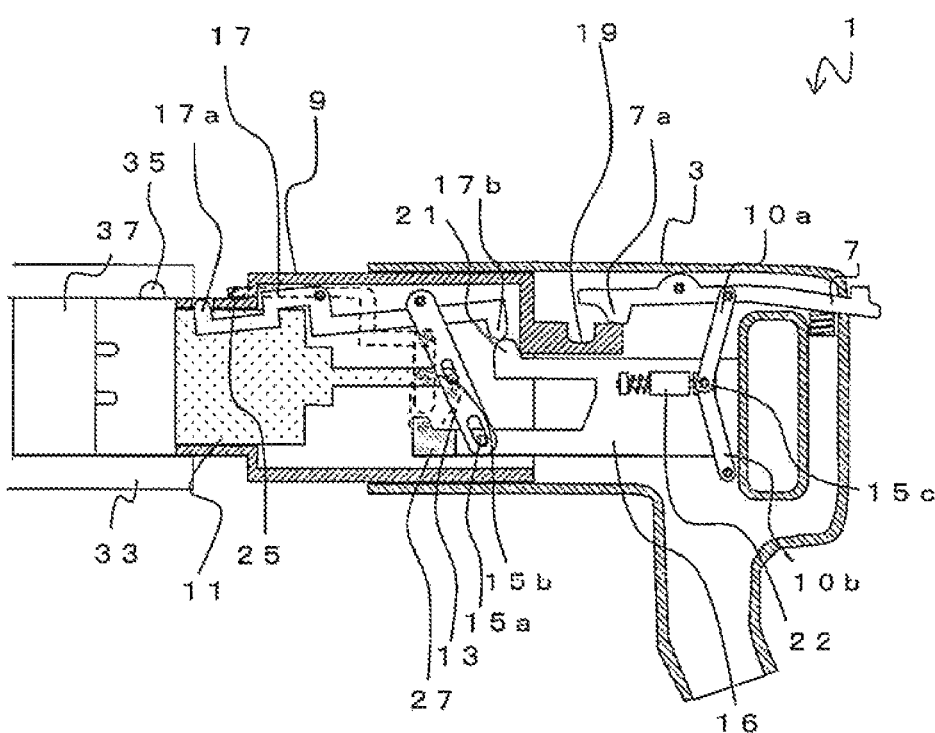
FIG. 8 is a sectional side view that shows a state in which the power supply connector 1 is connected to the power reception connector 33.

Next, the method of utilizing the power supply connector 1 will be described. FIG. 8 to FIG. 11 are figures that show the process of connecting the power supply connector 1 to the power reception connector 33. First, as shown in FIG. 8, the power supply connector 1 in a normal state is faced toward the power reception connector 33, which is the object of connection. Specifically, the tip of the case 9 is inserted into the power reception connector side. Note that a connector body 37 is accommodated within the power reception connector 33. In this state, the male-female terminals of the connector bodies 11 and 37 are arranged with a slight gap and are not in a state of connection. In this state, the tip of the slider 25 does not come in contact with the power reception connector 33 and protrudes from the front of the case 9.

As described previously, in a state where the slider 25 protrudes, the cam member 27 interferes with the connection bar 16 (FIGS. 4(*a*), (*b*) and (*c*)). Thus, the connection bar 16 is prevented from moving further to the front by the cam member 27. For this reason, the movement of the grasping member, to which the connection bar 16 is fixed, with respect to the case 9 is regulated and locked.

Thus, the grasping member 3 would not move forward with respect to the case 9, even when, for example, the case 9 is inserted into the power reception connector 33 obliquely, or the case 9 comes in contact with the rim of the power reception connector 33. That is, when the cam member 27, which is a case lock mechanism, is in the normal position, the case 9 is not pushed in towards the interior of the grasping member 3, even when the grasping member 3 is pushed forward.

Further, in a state in which the case 9 is arranged in the power reception connector 33 side, a concaved part 35, which is the locking part, is formed at a position corresponding to the lock pin 17*a*, within the power reception connector 33 side. To align the position of the lock pin 17*a* and the concaved part 35, or to align the position of the aforementioned male-female terminals, a guide etc. may be formed on the outer surface of the case 9 for determining the position in relation to the power reception connector 33 side.

Figure 9:
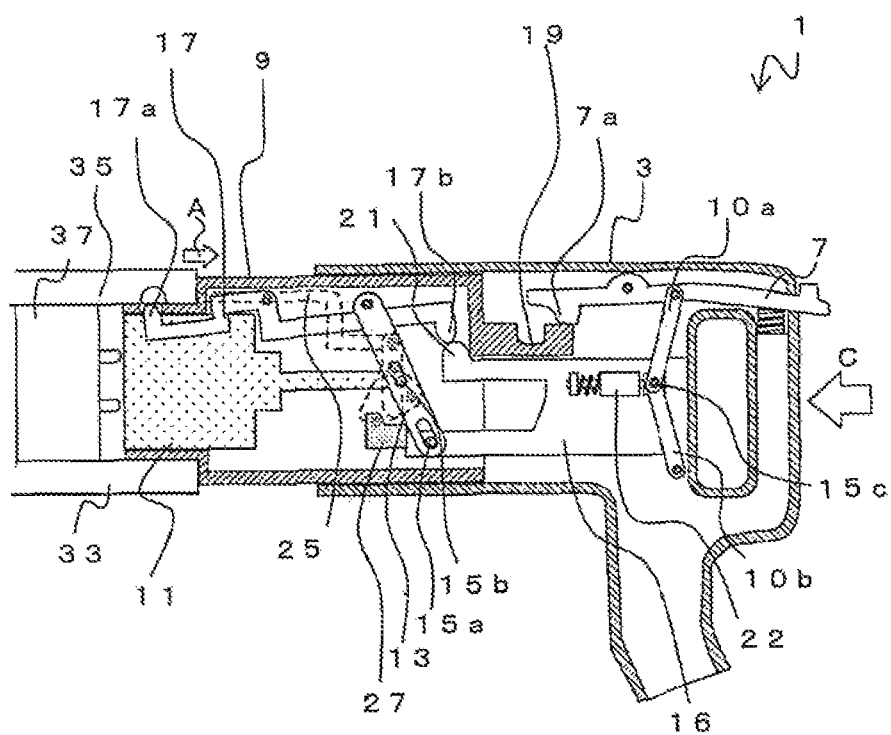
FIG. 9 is a sectional side view that shows a state in which the power supply connector 1 is connected to the power reception connector 33.

Next, as shown in FIG. 9, the grasping member 3 of the power supply connector 1 is pushed into the power reception connector 33 side (in the direction of arrow C in the figure), which leads the level difference of the case 9 to touch the rim (wall part at the front of the concaved part 35) of the power reception connector 33. Since the slider 25 protrudes from the level difference part of the case 9, the slider 25 comes in contact with the rim of the power reception connector 33.

Thus, as shown in FIG. 6, the slider 25 is pushed in toward the rear (to the interior of the case 9) (in the direction of arrow A in the figure). As described previously, when the slider 25 moves to the rear side, the link members 41, 43 and the cam member 27 move in an inter-connected manner. That is, the cam member 27 moves upward and the case lock mechanism is released. Note that, although details will be described later, when there is a defect in the wall part at the front of the concaved part 35, the slider 25 does not come in contact with this wall and will not be pushed into the case 9. Thus, the case lock mechanism will not be released.

Note that the method of detecting the presence of defect at the locking part is not limited to the use of a slider 25 and link members 41, 43 etc., as shown in the figure, and may be any method as long as it is a mechanism that operates when the case 9 is inserted. For example, the movement of the pair of sliders 25 may be done using a pulley or piston etc. That is, the structure may be any structure, as long as the case lock mechanism is released only when both sliders 25 of the pair are pushed in.

In this manner, when the case 9 is completely inserted into the power reception connector 33, the fact that there is no defect in the vicinity of the locking part with the lock pin 17*a* of the power reception connector 33, can be detected by both sliders 25*a*, 25*b* being pushed into the case 9. In such case, the locked state of the case 9 and the grasping member 3 is released, allowing both to move.

Figure 10:
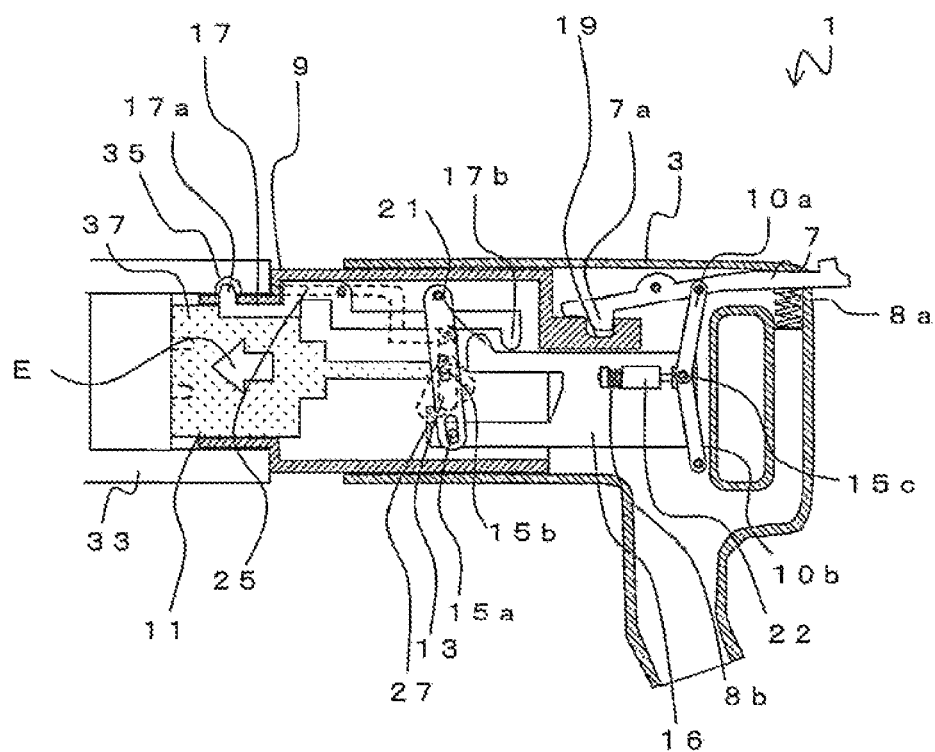
FIG. 10 is a sectional side view that shows a state in which the power supply connector 1 is connected to the power reception connector 33.

Next, as shown in FIG. 10, the grasping part 3 of the power supply connector 1 is pushed into the power reception connector 33 side. As previously stated, since the case 9 comes in contact with the power reception connector 33, it cannot be pushed in further. On the other hand, the locked state of the grasping member 3 with respect to the case 9 is released. That is, the state of interference between the cam member 27 and the connection bar 16 is eliminated (FIG. 6(*c*)). Thus, the connection bar 16 moves forward.

For this reason, the grasping member 3 can be moved forward with respect to the case 9. At this point, the connector body 11 moves forward with respect to the case 9 (in the direction of arrow E in the figure) along with the movement of the grasping member 3. Thus, the connector body 11 protrudes from the front of the case 9 and connects to the connector body 37 of the power reception connector side.

Here, when the ratio of the movement distance of the grasping member 3 and the connector body 11 with respect to the case 9 is 2:1, by pushing the grasping member 3 in a movement distance that is twice the spare length of connection, which connects the connector body 11 and the connector body 37, the connector body 11 can be moved just enough to allow the connectors to connect. That is, the connectors can be connected by pushing in the grasping member 3 with half the force necessary for connecting the two connectors (i.e., the interconnection resistance). Note that the deceleration ratio of the deceleration mechanism can be set arbitrarily, taking into consideration the interconnection resistance and operability.

Further, in the state shown in FIG. 10, as described previously, the lock pin 17*a* fits into the concaved part 35. For this reason, the power reception connector 33 and the power supply connector 1 are locked in a connected state. Here, when a defect is detected in the vicinity of the concaved part 35 (locking part) by the defect detection means, the slider 25 is not pushed into the case 9, and the case lock is not released. Thus, the lock pin 17*a* only fits into the concaved part 35 when there is no defect in the vicinity of the concaved part 35, and the power supply connector 1 and the power reception connector 33 are locked.

Further, in such state, the lock pin 7*a* at the end of the lock lever 7 fits into the concaved part 19. For this reason, the movement of the grasping member 3 with respect to the case 9 is locked. Thus, even when the cable etc., which is abbreviated in the figure, is pulled, the power supply connector 1 is not easily disconnected from the power reception connector 33.

When the lock pin 7*a* fits into the concaved part 19, the connected connectors become electrically conductible.

Figure 11:
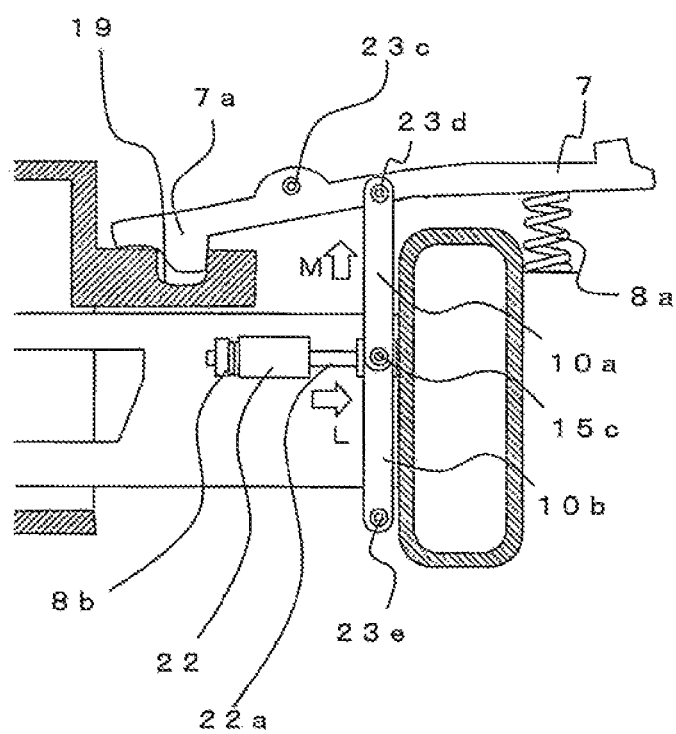
FIG. 11 is an enlarged view of the vicinity of the lock lever 7 in a state in which the electromagnetic solenoid 22 is operated.

When electric conduction of the connectors begins, as shown in FIG. 11, the electromagnetic solenoid 22 operates. The electromagnetic solenoid 22 constantly pushes the plunger 22*a* toward the linkage 15*c* in opposition to the spring 8*b* (in the direction of arrow L in the figure) during electric conduction. The link members 10*a* and 10*b* move apart in an opening direction by the movement of the plunger 22*a*. Thus, the top end part (pin 23*d*) of the link member 10*a* is pushed upward (in the direction of arrow M in the figure). Hence, it becomes impossible to release the lock lever 7 during electric conduction. For this reason, the operator cannot release the lock of the lock lever 7 during electric conduction, and the connection of the connectors cannot be pulled out.

Note that when disconnecting the power supply connector 1, by stopping electric conduction, the operation of the electromagnetic solenoid 22 stops. When the electromagnetic solenoid 22 stops, the plunger 22*a* is pulled backwards by the spring 8*b*. By pressing down the end of the lock lever 7 in this state, the lock pin 7*a* can be pushed up. By pulling back the grasping member 3 after the lock pin 7*a* is released from the concaved part 19, the joint 17*b* moves to the top of joint 21, which leads the lock by the lock pin 17*a* to be released. Thus, the power supply connector 1 can easily be disconnected.

As described above, by using the power supply connector 1 of the present embodiment, connection with the power reception connector 33 can be easily performed without the use of large force. In particular, because the pushing movement of the grasping member 3 by the operator matches the direction of connection of the connector body 11 in the power supply connector 1, the operator can easily understand the connection process instinctively.

Further, by providing a case lock mechanism that locks the case 9 and the grasping member 3, in a normal state, the grasping member 3 cannot move with respect to the case 9. Thus, the grasping member 3 cannot be moved into the case 9, while the case 9 is not completely inserted into the power reception connector 33.

Further, by arranging a pair of sliders 25a, 25b in the vicinity of both sides of the lock pin 17a, the lack of defects in the concaved part 35 (locking part) can be perceived with certainty. Further, the case lock is released and the connectors can be connected only when there is no defect.

Figure 12A:
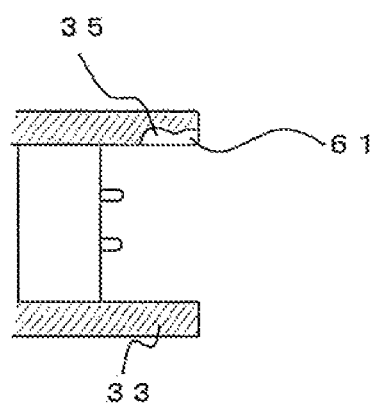
FIG. 12(a) is a sectional side view of a state in which a defective part 61 is provided on the power reception connector 33.
Figure 12B:
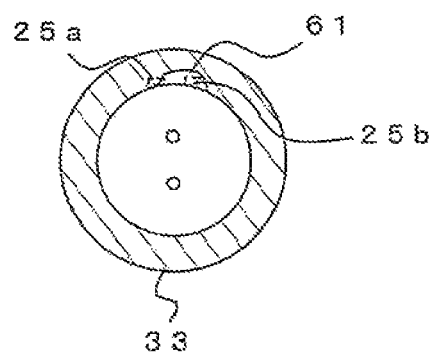
FIG. 12(b) is a front view of a state in which a defective part 61 is provided on the power reception connector 33.

For example, FIGS. 12(a) and (b) are conceptual diagrams that show a state in which a defective part 61 occurs partially in the vicinity of the concaved part 35 (the wall part at the front side of the concaved part 35), and FIG. 12(a) is a sectional side view and FIG. 12(b) is a front view of the power reception connector. As shown in FIG. 12(b), during connection of the connectors, the pair of sliders 25a, 25b are pushed against the power reception connector 33. Thus, as shown in the figure, even when most parts of the concaved part 35 is defective, when there is a part that is not defective, one slider 25a cannot detect the defect.

Figure 13A:
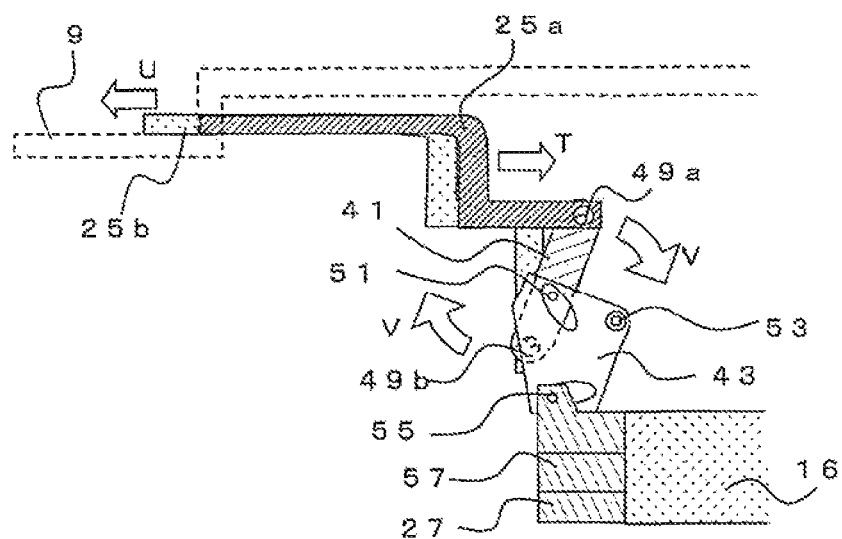
FIG. 13(a) is a figure that shows the movement of the defect detection means in a state in which defect is detected seen from one side.
Figure 13B:
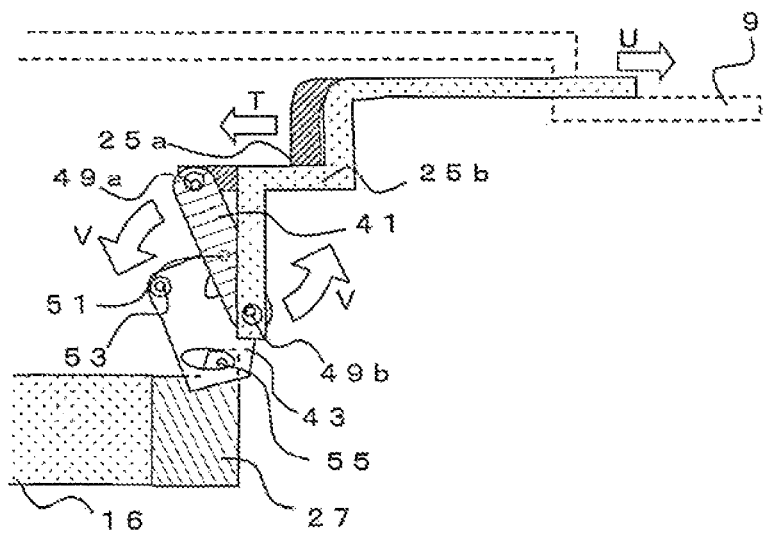
FIG. 13(b) shows the other side of FIG. 13(a).

FIGS. 13(a) and (b) are figures that show the movement of the defect detection means, and FIG. 13(a) shows a view from one side, and FIG. 13(b) is a view from the other side. In FIGS. 13(a) and (b), only slider 25a comes in contact with the power reception connector 33 and is pushed inside the case 9, and it shows a case in which slider 25b does not come in contact with the power reception connector side and is not pushed in, since it corresponds to the position of the defective part 61.

When only slider 25a is pushed in (in the direction of arrow T in the figure), the link member 41, due to the resistance from the link member 43, does not move parallel toward the rear, but rotates with the linkage 51 with the link member 43 acting as the center (in the direction of arrow V in the figure). Thus, in the link member 41, the linkage 49a with the slider 25a moves toward the rear with the linkage 51 acting as its center, while the slider 25b protrudes to the front (in the direction of arrow U in the figure).

In this case, the position of the link member 43 shows almost no change. Thus, the cam member 27, which is connected to the link member 43, does not move either. For this reason, the state of interference between the cam member 27 and the connection bar 16 (FIG. 4(c)) is maintained. That is, the case lock mechanism will not be released. Thus, the grasping member 3 does not slide with respect to the case 9, and the power supply connector 1 cannot be connected to the power reception connector 33. In this manner, when a partial defect is detected at the locking part of the power reception connector 33 with the power supply connector 1, it becomes impossible to connect the power supply connector 1 itself to the power reception connector 33, and thus, disconnection during electric conduct can be prevented.

Figure 14A:
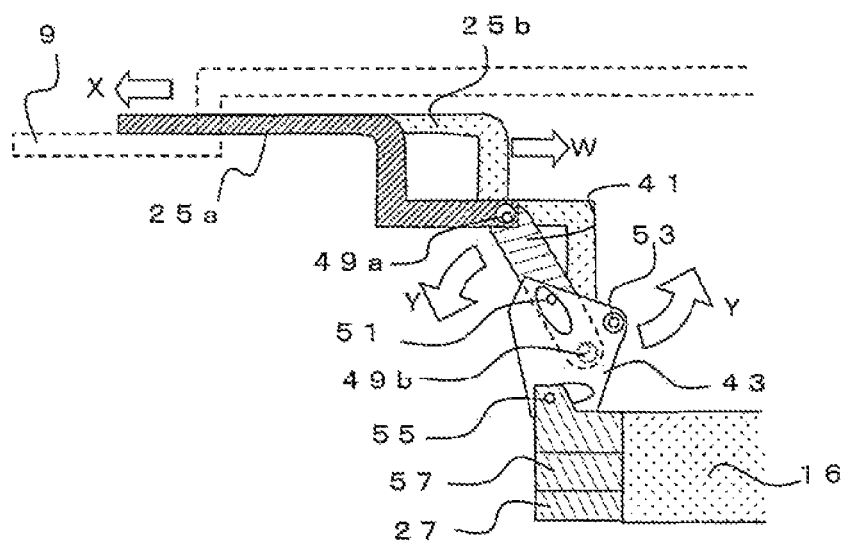
FIG. 14(a) is a figure that shows the movement of the defect detection means in a state in which defect is detected seen from one side.
Figure 14B:
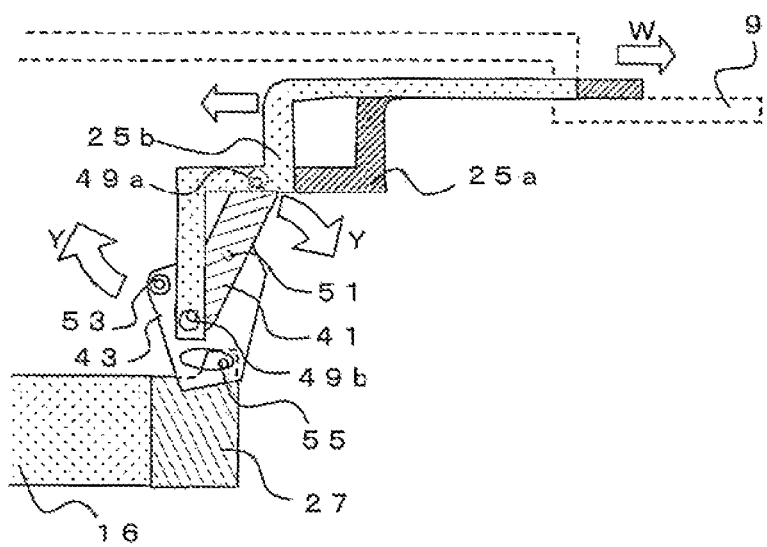
FIG. 14(b) shows the other side of FIG. 14(a).

Similarly, in FIGS. 14(a) and (b), only slider 25b comes in contact with the power reception connector 33 and is pushed into the case 9, and it shows a case in which slider 25a does not come in contact with the power reception connector side and is not pushed in, since it corresponds to the position of the defective part 61. When only slider 25b is pushed in (in the direction of arrow W in the figure), the link member 41, due to the resistance by the link member 43, does not move parallel toward the rear, but rotates with the linkage 51 with the link member 43 acting as the center (in the direction of arrow Y in the figure). Thus, in the link member 41, the linkage 49b with the slider 25b moves toward the rear with the linkage 51 acting as its center, while the slider 25a protrudes to the front (in the direction of arrow X in the figure).

In this case, the position of the link member 43 shows almost no change, too. Thus, the cam member 27, which is connected to the link member 43, does not move either. For this reason, the state of interference between the cam member 27 and the connection bar 16 (FIG. 4(c)) is maintained. That is, the case lock mechanism will not be released. In this manner, when a partial defect is detected at the locking part of the power reception connector 33 with the power supply connector 1, it becomes impossible to connect the power supply connector 1 itself to the power reception connector 33, and thus, disconnection during electric conduct can be prevented.

In this manner, in the present invention, when both sliders of the pair of sliders 25a, 25b are not pushed in, the case lock mechanism is not released. Thus, even when part of the power reception connector side is not defective and remains, the defect can be detected with certainty, and the connection and electric conduct between the connectors can be prevented. Note that the position of the slider 25 is not limited to that exemplified in the figure, and may be at any other part as long as it can detect the defect in the vicinity of the locking part between the power supply connector 1 and the power reception connector 33. Further, it does not necessarily have to be a pair, and the number of sliders 25 arranged is not limited as long as the defect can be detected with certainty. For example, more sliders 25 can be provided, and the case lock mechanism can be released only when all of those sliders 25 are pushed in.

Although embodiments of the present invention have been described in detail above with reference to the accompanying figures, the present invention is not influenced by such embodiments. It should be obvious to those in the field that examples of various changes and modifications are included within the realm of the technical idea of the present invention, and it should be understood that such examples are included in the technical scope of the present invention.

DESCRIPTION OF NOTATIONS 1 power supply connector
3 grasping member
5 handle
7 lock lever
7a lock pin
8a, 8b spring
9 case
10a, 10b link member
11 connector body
13 arm
15a, 15b, 15c, 15d linkage
16 connection bar
17 locking member
17a lock pin
17b joint
19 concaved part
21 joint
22 electromagnetic solenoid
22a plunger
23a, 23b, 23c, 23d, 23e pin
25, 25a, 25b slider
27 cam member
33 power reception connector
35 concaved part 37 connector body
41, 43 link member
49a, 49b, 51, 55 linkage
53 pin
57 concaved groove
59 convexed part
61 defective part

The invention claimed is:

1. A power supply connector for electric automobiles, which comprises:
   a connector body;
   a case for accommodating the connector body;
   a grasping member that is attached to the case;
   a locking member, which is provided in the case, and locks the case and a locking part of a power reception connector that is the object of connection;
   a defect detection means for detecting defect of the locking part to which the locking member locks; and
   a case lock mechanism that limits the movement of the case with respect to the grasping member; wherein
   when a defect of the locking part is detected by the defect detection means, the sliding motion of the connector body and the grasping member with respect to the case is locked by the case lock mechanism, and
   when a defect of the locking part is not detected by the defect detection means, the case lock mechanism is released and the connector body and the grasping member become slidable in a direction of nearly the same axis line with respect to the case, and
   the defect detection means comprises at least one pair of sliders, which are slidable in the insertion-removal direction of the case, formed in the vicinity of both sides of the locking member; and
   when the connector body is connected to the power reception connector, if both sliders in the pair of sliders comes in contact with the locking part and is pushed toward the inside of the case, the case lock mechanism is released and the connector body and the grasping member become slidable in a direction of nearly the same axis line with respect to the case, and
   when the connector body is connected to the power reception connector, if at least one slider in the pair of sliders does not come in contact with the locking part and is not pushed toward the inside of the case, the case lock mechanism is not released, and
   in a state where the case lock mechanism is released, when the grasping member is moved toward the front with respect to the case, the connector body becomes movable toward the front with respect to the case, along with the movement of the grasping member.

2. The power supply connector according to claim 1, wherein
   force is added to the pair of sliders in a direction so that they protrude from the case; and
   the ends of the pair of sliders are each rotatably connected to both ends of a first link member; and
   a second link member is rotatably connected to approximately the center of the first link member; and
   the second link member is rotatably connected to the case, while a cam member is connected thereto; and
   the case lock mechanism regulates the sliding of the grasping member with respect to the case by the interference between the cam member and the grasping member; and
   when both sliders in the pair of sliders are pushed into the case, the first link member is pushed toward the back, and the second link member rotates along with the movement of the first link member, and the cam member moves in an approximately vertical direction to the sliding direction of the slider, whereby the grasping member becomes slidable; and
   when at least one slider in the pair of sliders is not pushed into the case, the state of interference between the cam member and the grasping member is maintained and the case lock mechanism is not released.

* * * * *